United States Patent [19]

Eibner et al.

[11] 4,295,043
[45] Oct. 13, 1981

[54] FIBER OPTIC CABLE CONNECTOR

[75] Inventors: Jules A. Eibner, Dresher; Franz X. Kanamuller, Glenside, both of Pa.

[73] Assignee: Sperry Corporation, New York, N.Y.

[21] Appl. No.: 103,270

[22] Filed: Dec. 13, 1979

[51] Int. Cl.³ .............................................. G02B 5/14
[52] U.S. Cl. .................................... 250/227; 350/96.2
[58] Field of Search ...................... 250/227, 239, 2.5; 350/96.1, 96.15, 96.2

[56] References Cited

U.S. PATENT DOCUMENTS 4,118,100 10/1978 Goell et al. ......................... 350/96.2
4,223,217  9/1980 Bongard et al. ..................... 250/227

*Primary Examiner*—David C. Nelms
*Attorney, Agent, or Firm*—Robert E. Lee, Jr.; William E. Cleaver; Marshall M. Truex

[57] ABSTRACT

The present invention comprises selectively locating electrical shorting rings on the male section of an optical cable connector. The particular locations of the rings chosen is commensurate with the length of the cable and provides a basis for amplifying the signals being transmitted along the optical cable. On the female section of the cable connector there are electrical contact devices which can be shorted by the rings on the male section if such rings are present. There is a selectable amplifier circuit connected to the optical cable and the contact devices, and depending upon which contact devices are shorted the amplifier circuit provides the proper amplification to the optical signals which are being converted into electrical signals.

7 Claims, 9 Drawing Figures

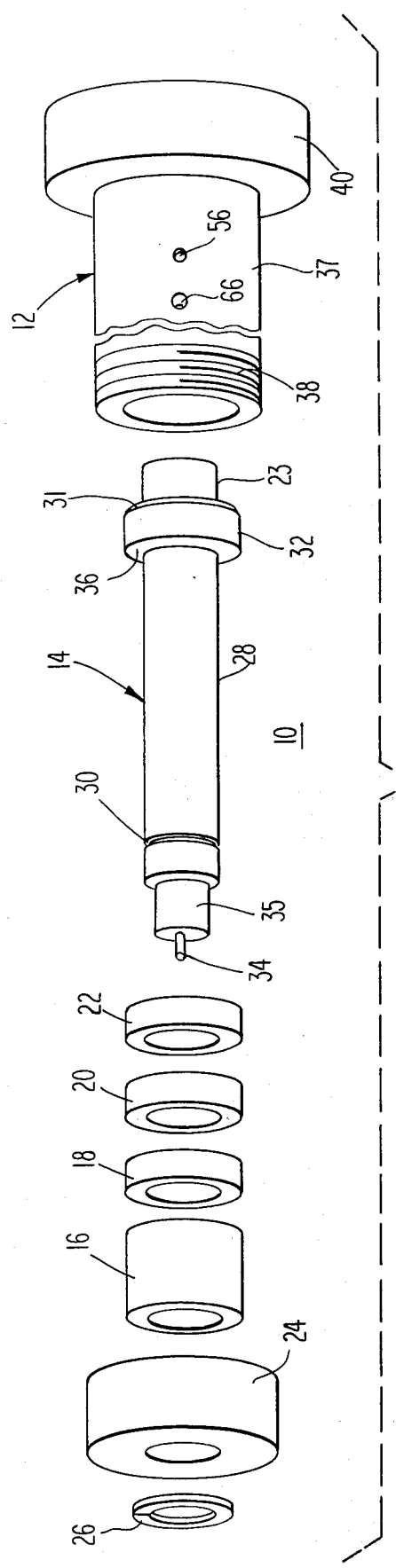
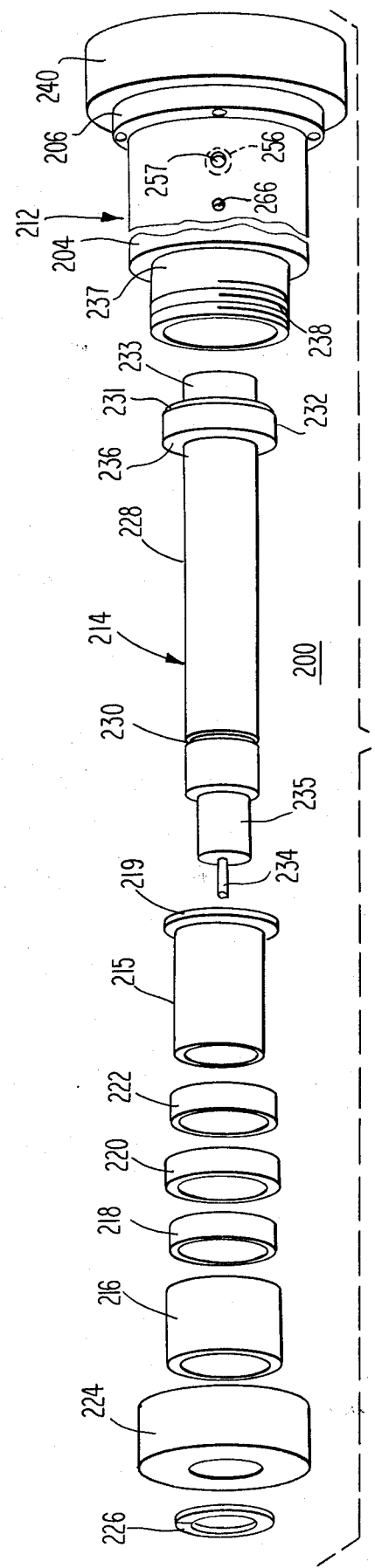

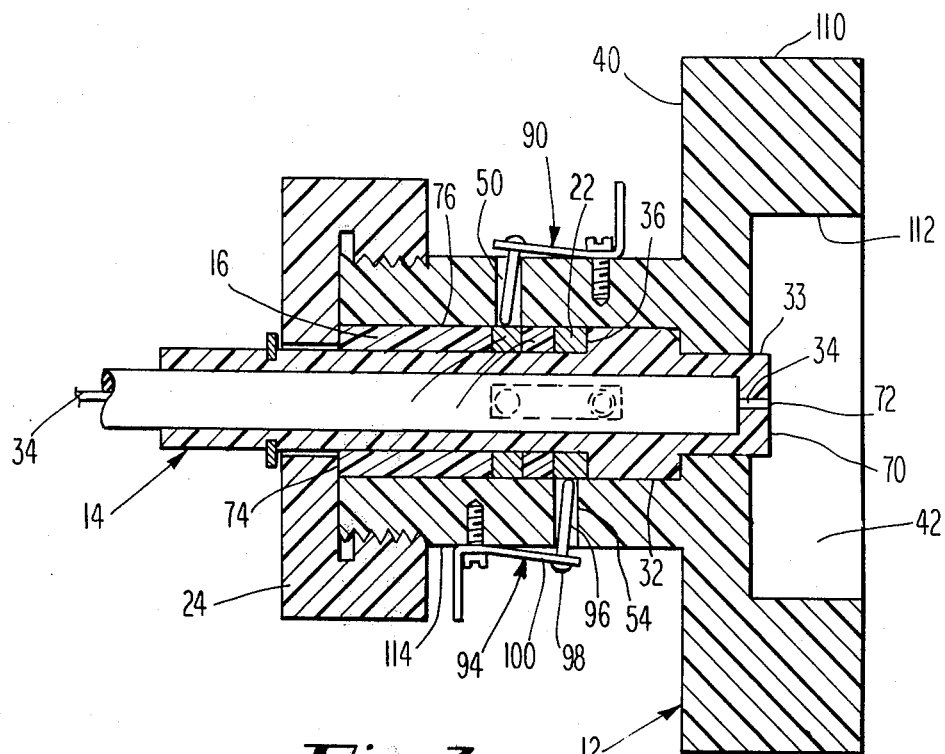
*Fig. 3*
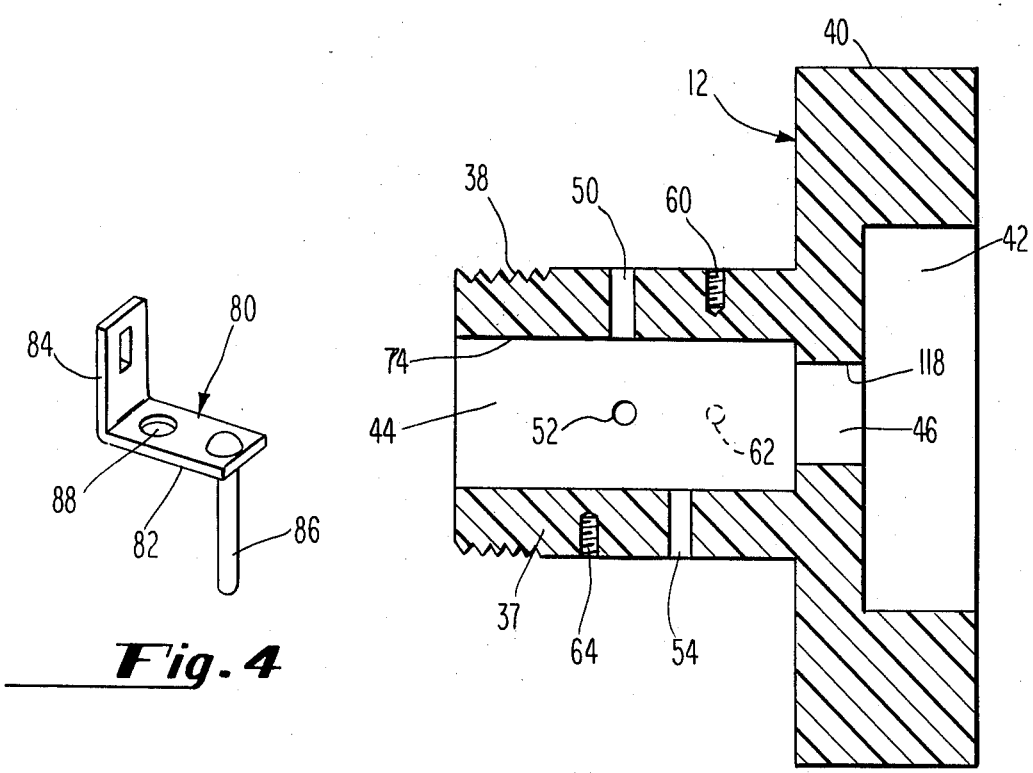
*Fig. 4*
*Fig. 2*

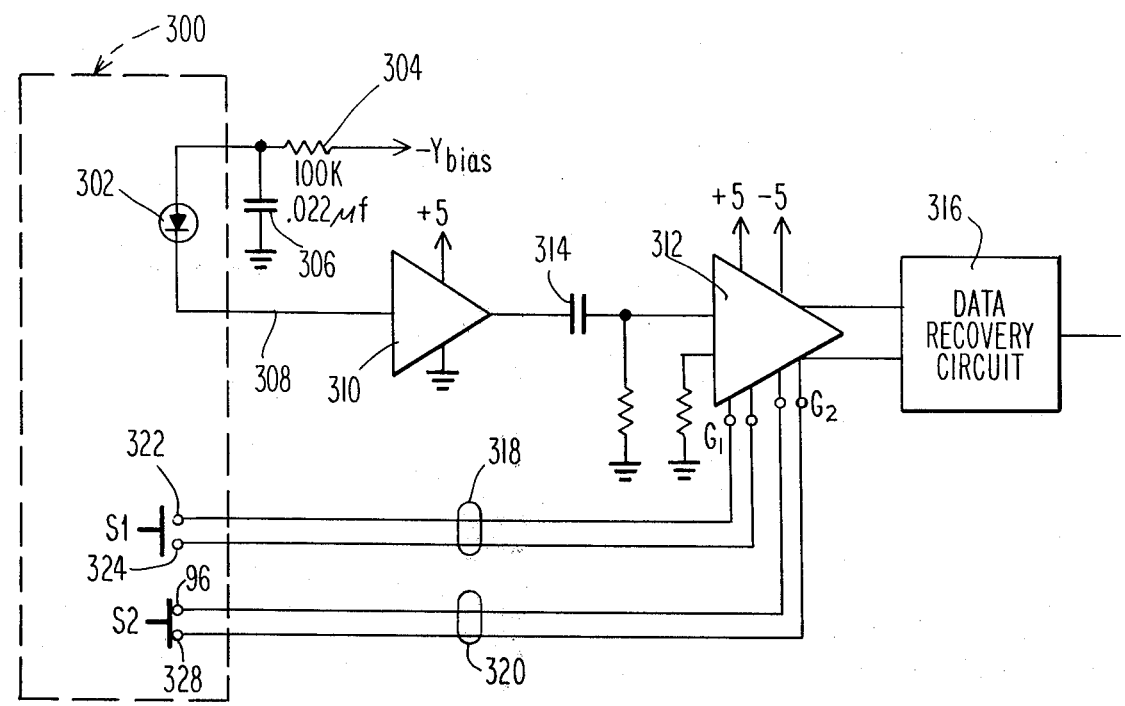
_Fig. 8_
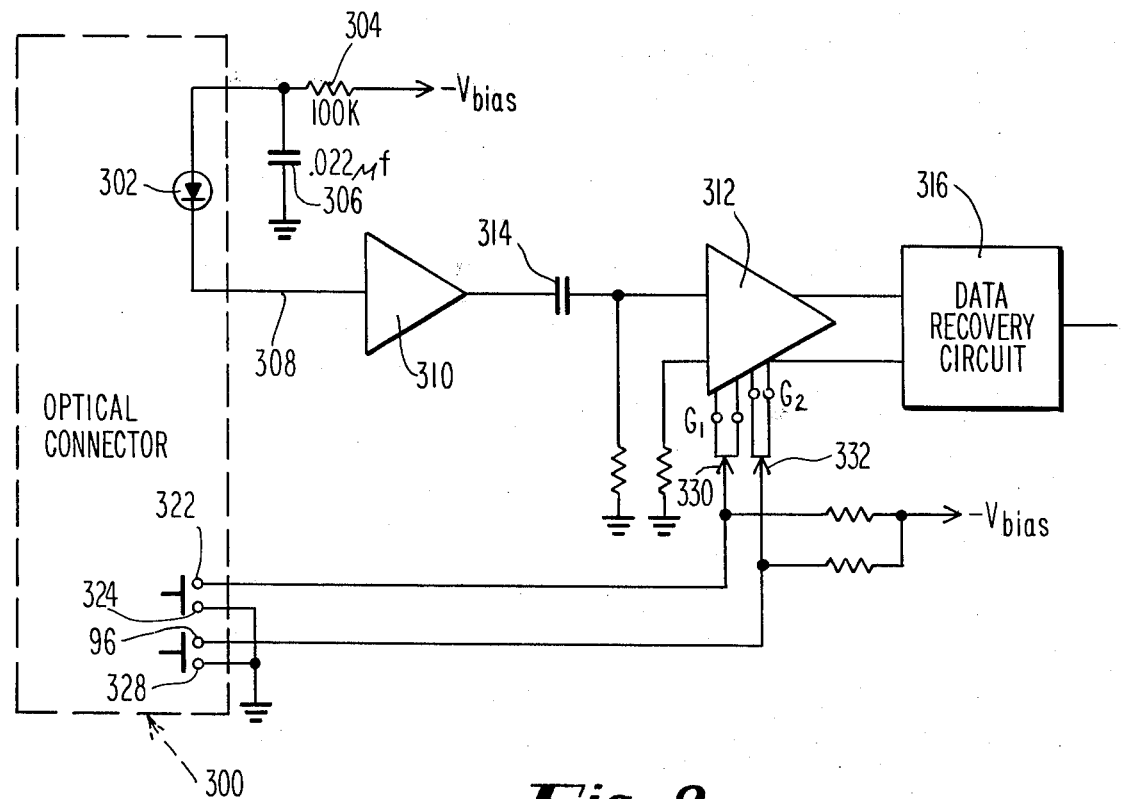
_Fig. 9_

FIBER OPTIC CABLE CONNECTOR

BACKGROUND OF THE INVENTION

Fiber optic cables are used today for carrying data as light pulses between various parts of a computer system. For example, fiber optic cables can link a plurality of host computers together, or link a host computer to one or more peripheral devices, or link a plurality of peripheral devices together. Cable lengths vary from a fraction of a meter to 30 or more meters. Advantages of fiber optic cables are their small weight and size and immunity to electromagnetic interference.

Date is placed on the cable by triggering a light source such as a light emitting diode placed in close proximity to one end of the fiber optic cable and attached thereto by a suitable connector. A light sensitive device such as a photodetector diode is positioned adjacent to the other end of the cable and also held in position by a suitable fiber optic connector. The photodetecting diode provides a small current output in response to light pulses received. The strength of the current output is proportional to the light received but in all cases this signal must be amplified by subsequent preamplification before further processing by the receiving circuitry to extract the data.

Commercially available, low cost fiber cables have an attenuation of approximately 0.6 db per meter. A 30 meter (100 foot) section has an attenuation loss of 18 db while a 3 meter (10 feet) section has an attenuation loss of only 1.8 db. Therefore, the power variation in cable attenuation between a 3 meter section of cable and a 30 meter section is 16 db which is equivalent to a 32 db variation in voltage. This means that the receiver amplifier section sees a dynamic range of 32 db in voltage which is too large a voltage variation for it to handle without the use of complicated automatic gain circuits (AGC). Even if the attenuation of the cable is reduced, applications requiring much longer runs of cable are sure to occur whereby wide variations in attenuation between cables of varying length becomes a problem.

SUMMARY OF THE INVENTION

The present invention comprises a novel connector for interchangeably connecting optical cables of various lengths to electrical circuits whereby the circuits are caused to compensate automatically for the loss of signal in the cable due to its length. The connector comprises a hollow cable holder body which grips one end of a fiber optic cable, and a connector housing means which grips the cable holder body and is formed to locate one end of the cable holder body in close proximity to a portion of the electrical circuit. A length indicating means for selecting a value of a predetermined parameter of the electrical circuit when the length indication means is connected to the electrical circuit is disposed between the cable holder body and the connector housing means. The connector further comprises an electrically conducting contact means attached to the connector housing means for electrically connecting the length indication means to the electrical circuit. The contact means makes an electrically insulating contact with the connector housing means.

The connector housing means further comprises a hollow body portion and an access means for providing access to the length indication means from outside of the connector. In one embodiment, the access means comprises at least one access hole and the contact means comprises at least one contact lug positioned in the access hole to contact the length indication means. In the preferred embodiment, there are first and second pairs of access holes with the first pair being located in a first cross-sectional region of the hollow body portion located at a predetermined position along its length. The second pair of access holes are located in a second cross-sectional region spaced along the length of the hollow body portion. Contact lugs are disposed in each of the access holes of the first and second pairs. The length indication means comprises first and second spaced apart connector members, either of which can be electrically conducting or electrically non-conducting depending on the length of the cable. The connector members are aligned with the first and second pair of access holes so that the contact lugs associated with the first pair of access holes contact the first connector member but not the second, and the contact lugs associated with the second pair of access holes contact the second member but not the first.

The present invention further comprises a connection arrangement for connecting an optical cable to an electrical circuit including the connector described above in combination with an electrical circuit which includes a photodetector and a variable gain preamplifier attached thereto. The contact lugs of the contact members disposed in the access holes are also connected to the preamplifier. In one embodiment, the variable gain preamplifier has a plurality of gain settings and at least first and second pairs of gain setting terminals. The electrical circuit further comprises a connection circuit means for connecting the pairs of gain setting terminals to the contact members which are associated with the first and second pairs of access holes respectively. One embodiment of the connection circuit means comprises first and second field effect transistors (FET) connected to the first and second gain setting terminals respectively. The gate connection of the first FET is connected to one of the contact members associated with the first pair of access holes. The gate of the second FET is connected to one of the contact members associated with the second pair of access holes.

With this invention, it is not necessary to have access to the inner electronics of a computer system in order to compensate for the loss in signal due to varying fiber optic cable lengths. The connector and the electrical circuit cooperate in such a way as to automatically compensate for the attenuation of signal in longer length cables.

Other objects, features and advantages of the present invention will become more fully apparent from the following detailed description of the preferred embodiment, the appended claims and the accompanying drawings in which:

FIG. 1 is an exploded view of a preferred embodiment of the connector.

FIG. 2 is an enlarged elevational cross-sectional view of a portion of the connector in FIG. 1.

FIG. 3 is an enlarged elevational cross-sectional view of the connector of FIG. 1 shown assembled.

FIG. 4 is a three dimensional view of a portion of the connector of FIG. 1.

FIG. 5 is an exploded view of an alternate embodiment of the connector of FIG. 1.

FIG. 8 is a schematic of an electrical circuit for use with the connector of FIG. 1 or 6.

FIG. 9 is an alternate embodiment circuit for use with the connectors of FIG. 1 or 6.

DETAILED DESCRIPTION OF THE DRAWINGS

Figure 7:
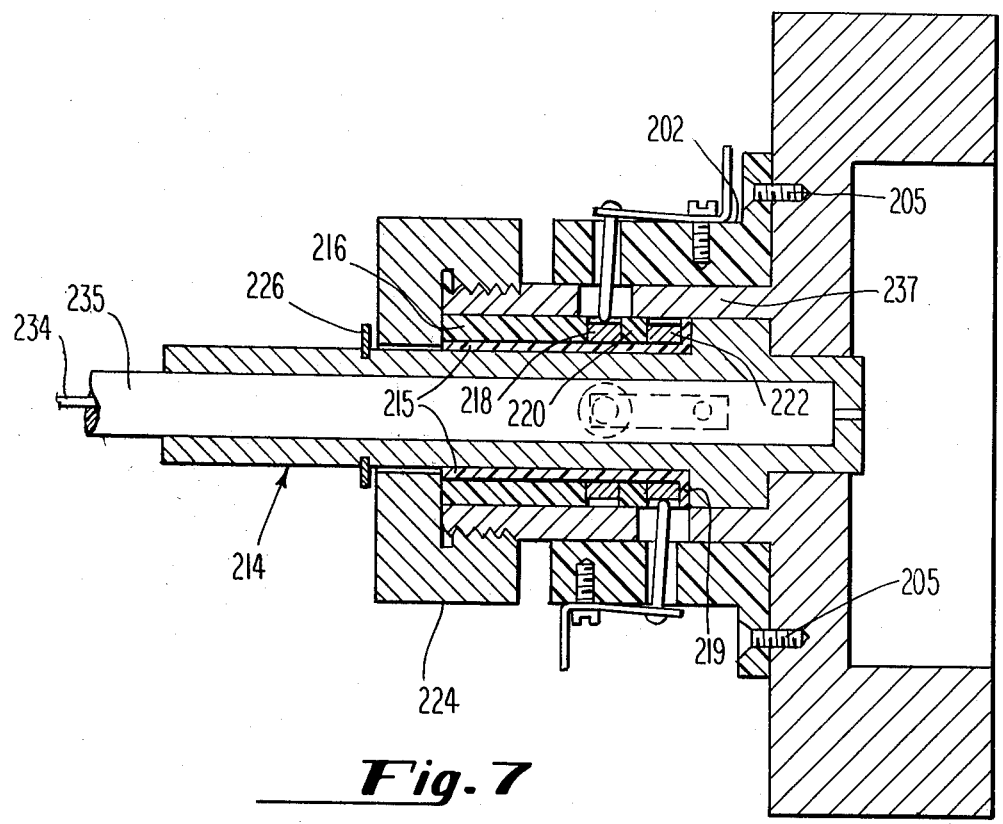
FIG. 7 is an enlarged elevational cross-sectional view of the connector of FIG. 5 shown assembled.

FIG. 1 is an exploded view of a preferred embodiment connector designated generally 10 of the invention. The connector comprises a female connector housing designated generally 12; a hollow cable holder body designated generally 14; connector members 18 and 22 and spacer members 16 and 20; and connector nut 24 with locking spring 26. The cable holder body 14 has an elongated section 28 of a first diameter, an enlarged circumferential section 32 of a second diameter larger than the first diameter, and an end section 33 having a diameter equal to the diameter of the elongated section 28 but separated therefrom by enlarged circumferential section 32. The lengths of enlarged circumferential section 32 and end section 33 are small compared with the length of elongated section 28. Also, section 32 is slightly chamfered at the corner 31 which faces section 32.

A fiber optic cable 34, with insulation 35 surrounding it, is shown extending out from one end of hollow cable holder body 14.

The connector housing 12, a cylindrical holder body 14, spacer members 16 and 20, and connector nut 24 of FIG. 1 are made from an electrically insulating material such as plastic in this preferred embodiment. Connector portions 18 and 22 can each either be electrically conducting such as metal or electrically non-conducting such as plastic depending upon the length of fiber optic cable to which the connector is attached.

The male end of the connector comprising cable holder body 14, spacer members 16 and 20, connector members 18 and 22, and connector nut 24 and locking spring 26 are assembled in the following way: The spacer members 16 and 20 and the connector members 18 and 22 ae circular in cross section and each has a hole through the center which is of a diameter just larger than the first diameter of cable holder body 14. The spacer members 16 and 20 and the connector members 18 and 22 slip onto and engage section 28. Connector member 22 fits up against a side 36 of enlarged circumferential section 32. After the spacer and connector members have been placed on cable holder body 14, connector nut 24 follows. The connector nut 24 also has a hole through its center which is slightly larger in diameter than the first diameter of elongted section 28. Connector nut 24 and spacer and connector members 16 through 22 are held in place by a locking spring 26 which slips onto elongated section 28 after nut 24 and snaps in place in circumferential slot 30 on elongated section 28. The spacer and connector members are held securely in place between connector nut 24 and enlarged circumferential section 32.

Connector housing 12 serves as the female end of the connector. It comprises a hollow cylindrical body portion 37 with a threaded end 38. At the other end, cylindrical body portion 12 is attached to a detector end portion 40 having a diameter larger than the diameter of cylindrical body portion 37. The inside diameter of cylindrical body portion 37 is just large enough to accept enlarged circumferential section 32 and the spacer and connector members 16 through 22 centered on elongated section 28 of cylindrical holder body 14 when the male assembly of the connector is inserted into the hollow portion of cylindrical body portion 37. Connector nut 24 is then turned onto the threaded end portion 38 of connector housing 12.

FIG. 2 shows an elevational cross-sectional view of connector housing 12. Detector end portion 40 partially encloses a detector region 42, and the hollow region of cylindrical body portion 37 is denoted 44. Hollow region 44 communicates with detector region 42 through hole 46 in detector end portion 40.

The cylindrical body portion 37 comprises a plurality of access holes which extend from the exterior surrounding the cylindrical body portion 37 to the hollow region 44 within whereby the hollow region communicates with the exterior. In the preferred embodiment, cylindrical body portion 37 is equipped with four access holes 50, 52, 54 and 56 and located at 90° intervals around the circumference of cylindrical body portion 37. Hole 56 is not shown in FIG. 2 but is shown in FIG. 1. Furthermore, in the preferred embodiment, holes 50 and 52 form a first pair of access holes which are aligned within a first circumferential cross-sectional region of cylindrical body portion 37. The first circumferential cross-sectional region being located at a preselected position along the length of the cylindrical body portion. Access holes 54 and 56 form a second pair of access holes similarly aligned within a second circumferential cross-sectional region adjacent the first circumferential cross-sectional region along cylindrical body portion 37. In the preferred embodiment, the access holes in each pair are located 90° apart from one another but they need not be. For example, the holes in each pair could be separated rotationally by 180° or any other amount which would provide reasonable separation of the holes. FIG. 2 also shows a plurality of threaded holes 60, 62 (shown dotted) and 64. FIG. 1 shows a fouth threaded hole 66. The purpose for these threaded holes will be explained hereinafter. In the preferred embodiment all holes lie along radials extending perpendicularly outward from the axis of said cylindrical hollow body portion.

FIG. 3 is an elevational cross-sectional view of the entire connector of FIG. 1 shown assembled. Note that the end section 33 of the cable holder body 14 extends through the hole 46 in the detector end portion 40 of connector housing 12 into detector region 42. The side of enlarged circumferential portion 32 opposite from side 36 is pressed up against a portion of detector end portion 40 which forms hole 46 adjacent hollow portion 44. The optical cable 34 extends through an opening in the end section 33 where a flat surface 72 of the cable 34 is flush with end section terminating surface 70 and is exposed to detector region 42.

As can be seen in FIG. 3, spacer and connector members 16 through 22 are held in place by the enlarged circumferential portion 32 and the surface 74 of connector nut 24. In the preferred embodiment, spacer member 20 and connector members 18 and 22 are approximately the same size in width and considerably narrower than spacer member 16. Spacer members 16 and 20 act as insulating members while connector members 18 and 22 are associated with the alignment hole pair 50 and 52, as well as hole pair 54 and 56 respectively. Spacer member 16 positions the three remaining spacer and connector members at a certain distance from the connector nut interior surface 74 so that connector member 18 is aligned with access holes 50 and 52. Spacer member 20 separates connector members 18 and 22 so that connector member 22 is aligned with access holes 54 and 56. Of course, the actual size of the spacer and connector members and their size relative to one another can vary depending on the size and shape of the other components of the connector.

The connector 10 further comprises an electrically conducting contact means for electrically connecting connector members 18 and 22 to parts of an external electric circuit. FIG. 4 shows a preferred embodiment contact member designated generally 80 in more detail. Contact member 80 comprises a base portion 82 for attachment to the connector 10, a terminal lug 84 attached to one end of the base portion 82 and extending away therefrom, and a contact lug 86 attached to an end of base 82 opposite from terminal lug 84 and extending away from the base portion in a direction opposite from terminal lug 84. Base portion 82 also functions as a leaf spring in the direction of contact lug 86.

In the preferred embodiment, the contact member 80 is attached to a threaded hole in the cylindrical body portion 37 of connector housing 12 by a screw inserted through hole 88 in the base portion 82. Base portion 82 is of such a length that, when attached to the cylindrical body portion 37 in this way, the contact lug 86 fits into an associated access hole to contact a connector member such as member 18 or 22.

In the preferred embodiment there are four contact members attached to connector housing 12 using threaded holes 60, 62 and 64 (shown in FIG. 2) and hole 66 (shown in FIG. 1). FIG. 3 shows three of these contact members designated generally 90, 92 and 94 with contact member 92 shown in dotted lines.

The length of the extended portion 96 of connector lug 98 of contact member 94, for example, is slightly larger than the length of access hole 54 and accordingly, the leaf spring like base portion 100 forces the extended portion 96 against the connector member 22. When the male end of the connector is inserted into hollow 44, the extended portion 96 is cammed gently by a chamfer 31 on section 32 into the hole 54.

FIG. 5 is an exploded view of another preferred embodiment connector designated generally 200. The connector comprises a female connector housing designated generally 212; a hollow cable holder body designated generally 214; an interior insulating sleeve 215; spacer members 216 and 220 and connector members 218 and 222; and connector nut 224 with locking spring 226. The cable holder body 214 is similar in shape to the cable holder body 14 of FIG. 1 and includes an elongated section 228, an enlarged circumferential section 232 with chamfered corner 231, and an end portion 233.

A fiber optic cable 234 with insulation 235 is shown extending out from one end of hollow cable holder body 214.

Except for an external electrical insulation bushing 202, the remaining part of connector housing 212 is made up of an electrically conducting material such as metal. The cable holder body 214 is also made from an electrically conducting material such as metal in the preferred embodiment and so is the connector nut 224. Interior insulating sleeve 215 and spacer members 216 and 220 are made from an electrically insulating material and connector member 218 and 222 can either be electrically conducting such as metal or electrically non-conducting such as plastic depending upon the length of the fiber optic cable to which the connector 200 is attached. Hence, the connector 200 of FIG. 5 is basically a metallic connector design while the connector 10 of FIG. 1 is plastic.

The male end of connector 200 comprising the cable holder body 214, an interior insulating sleeve 215, the spacer and connector members 216 through 222 and connector nut 224 with locking spring 226 are assembled in a similar manner to the assembly of male end of connector 10 in FIG. 1. However, the spacer and connector members 216 through 222 are first positioned or inserted over the elongated section 217 of interior insulating sleeve 215 before the entire assembly of insulating sleeve 215 and spacer and connector portions 216 through 222 are positioned over the elongated section 228 of cable holder body 214. The insulating sleeve 215 is equipped with a ring end portion 219 which comes to rest against a side surface 236 of enlarged circumferential portion 232. The interior insulating sleeve 215 provides electrical insulating between the connector members 218 and 222 from the metallic or electrically conducting cable holder body 214.

Connector housing 212 serves as the female end of the connector. It comprises a hollow cylindrical body portion 237 with a threaded end 238. At the other end, cylindrical body portion 212 is attached to a detector end portion 240 having a diameter larger than the diameter of cylindrical body portion 237. The inside diameter of cylindrical body portion 237 is just large enough to accept the enlarged circumferential portion 232 and the spacer members 216 and 220 centered on interior insulation sleeve 215 when the male assembly of the connector is inserted into the hollow cylindrical body portion 237. The outer diameters of connector members 218 and 222 are slightly smaller than the outer diameters of spacers 216 and 220 to avoid electrical contact with connector housing 237. The connector housing 212 further comprises an external insulating bushing 202 having an elongated body portion 204 connected to an end ring portion 206. The bushing 202 is attached to connector housing 212 by screws such as screw 205 in FIG. 5. When the male end of the connector is inserted into the hollow portion of the female end of the connector, connector nut 224 is turned onto the threaded end portion 238 of connector housing 212 to lock the connector in place.

Figure 6:
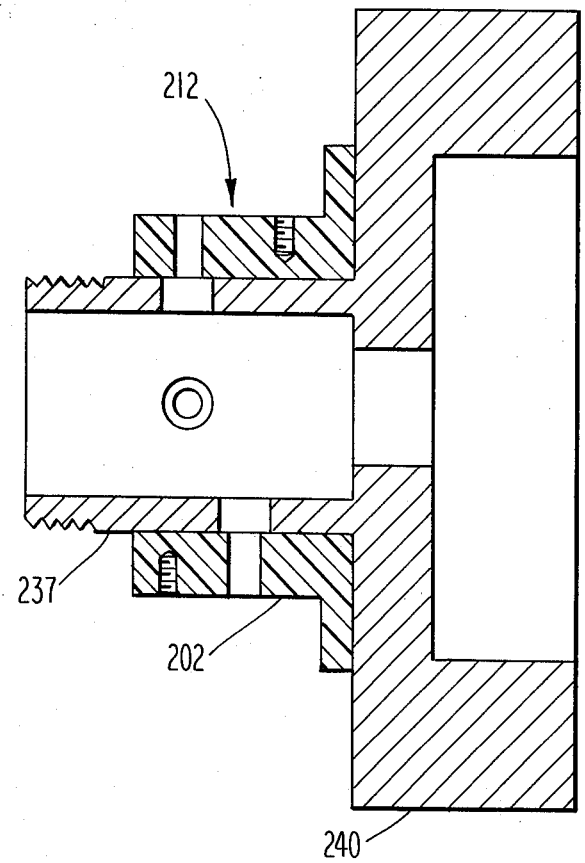
FIG. 6 is an enlarged elevational cross-sectional view of a portion of the connector of FIG. 5.

FIGS. 6 and 7 show elevational cross-sectional views of connector housing 212 and connector 200 which are similar to the cross-sectional views of FIGS. 2 and 3. It is believed that no further description of the arrangement is necessary for these skilled in the art in view of the descriptions of FIGS. 2 and 3.

FIG. 8 is a preferred embodiment schematic showing the optical cable connector and electrical circuit arrangement of the invention. The connector 10 of FIG. 1 is represented by the dotted box designated generally 300 in FIG. 8. A photo diode 302 is shown within the connector 300. It should be recalled that the connector 10 comprises an end detection portion 40 which provides for a hollow region 42. Hollow region 42 is adapted to receive the photodetector 302. In one embodiment, the photodetector is housed in a cylindrical can which fits within the cylindrical region 42 where it is cemented in place. Other means of attaching a photodetector to the female end of the connector can be utilized such as mechanical retention means. The cylindrical can of the photodetector has a light transparent region on the top which fits up against the end 72 of fiber optic cable 34. Light passes from the cable 34 through the transparent region of photodetector 302 to the photosensitive region of the photodetector where a small current is generated proportional in strength to the intensity of the light received. In the preferred embodiment, the photodetector is shown suitably biased by a negative bias voltage (−V) in series with a 100 K resistor 304. A 0.022 uf capacitor 306 is shown connected to ground between the photodetector 302 and resistor 304.

Photodetector 302 is connected via line 308 to transimpedance amplifier 310 which, in the preferred embodiment, is a model number TIEF 151 made by Texas Instruments, Inc. It provides an output voltage linearly proportional to its input current which is furnished by the photodetector 302. The output voltage from amplifier 310 is shown coupled to preamplifier 312 via the capacitor 314. The preamplifier 312 is, in the preferred embodiment, a variable gain National Semiconductor LM733 differential video amplifier. The output of the preamplifier is sent to a data recovery circuit 316 whose details are not material to the invention.

Preamplifier 312 is capable of three gain settings of 10, 100, and 400. The preamplifier 312 is equipped with two pairs of gain setting terminals indicated by G1 and G2. If the terminal pair G1 is shorted together, the preamplifier 312 will have a voltage gain of 100; if G2 is shorted together, then the preamplifier 312 will have a gain setting of 400; and if neither terminal pairs are shorted together, then the gain setting is 10.

Gain setting terminals G1 and G2 are connected to connector 10 via line pairs 318 and 320 respectively. In the preferred embodiment, line pair 318 is connected to a pair of cross-sectionally aligned contact lugs from contact members 90 and 92 in FIG. 3 and represented by the dots 322 and 324 in FIG. 8. These contact lugs would be positioned within access holes 50 and 52 respectively in hollow body portion 37 of connector 40. Similarly, line pair 320 is connected to a pair of contact lugs represented by dots 96 and 328 in FIG. 9 which would be located in cross-sectionally aligned access holes 54 and 56 in hollow body portion 37.

Contact lugs 322 and 324 in access holes 50 and 52 respectively are in contact with connector member 18 which in the preferred embodiment is a circular ring shaped member surrounding cable holder body 14. This connector member can be electrically non-conducting or electrically conducting. If electrically non-conducting, then terminal pair G1 is open and the gain setting of 100 is not selected. This is represented schematically in FIG. 8 by the open switch S1 from contact members 322 and 324. However, if connector member 22, similar in shape to connector member 18, is electrically conducting then gain setting terminal pair G2 will be shorted together and a gain setting of 400 will be selected in preamplifier 312. This is so because the contact lugs 96 and 328 connected to the terminal pair G2 are in contact with a common metal member, the connector member 22. If both connector members are electrically non-conducting then neither terminal pair G1 or G2 are shorted and the preamplifier 312 will have a gain of 10. In FIG. 8, switch S2 is shown shorting control lugs 326 and 328. In the preferred embodiment there is no provision for both connector members 18 and 22 to be simultaneously conducting, but it is conceivable that such an arrangement would be desirable with other circuits.

For purposes of description, the photodetector 302 and line pairs 318 and 320 were described as connected to connector 10. However, the photodetector 302 and line pairs 318 and 320 could have been described in a similar way for connector 200 of FIG. 6. Hollow body portion 237 is electrically conducting so it is necessary to mount the contact members on an exterior insulating layer 202 so that all contact lugs will not automatically be shorted together regardless of the nature of the connector members 218 and 222.

FIG. 9 is the same as FIG. 8 except for the presence of field effect transistors (FET) 330 and (FET) 332 in the circuit. Terminal pair G1 is connected to the source and drain terminals of FET 330 while the gate of FET 330 is connected to one of the contact lugs 322 or 324 associated with connector member 18. The gate of FET 330 is negatively biased by bias voltage (−V). If connector member 18 is electrically non-conducting then the bias voltage (−V) is applied to the FET gate and the terminal pair G1 is left open. Hence, the gain setting of preamplifier 312 associated with terminal pair G1 is inoperative. However, if connector member 18 is electrically conducting then contact lug 322 is shorted to contact lug 324 which is connected to ground. This then reduces the bias voltage to zero thereby allowing conduction to occur in FET 330 shorting terminal pair G1 and selecting the associated gain of 100 for preamplifier 312. Terminal pair G2 is similarly connected to contact lug 326 of the contact lug pair 96, 328. A different gain for preamplifier 312 can be selected depending on the conductivity of connector member 22.

The FET's allow shorting of the gain setting terminals near the preamplifier even when the connector is remote from the circuit. This is an advantage for wide bandwidth systems and in systems where noise levels are a problem.

While the present invention has been disclosed in connection with the preferred embodiment thereof, it should be understood that there may be other embodiments which fall within the spirit and scope of the invention as defined by the following claims.

We claim:
1. A connector which connects an optical cable to an electrical circuit, comprising:
 a cable holder body;
 a connector housing means formed to accept said cable holder body within and formed to locate a first end of said cable holder body in close proximity to a portion of said electrical circuit, said connector housing means being further formed to have access means;
 a length indication means for selecting a value of a predetermined parameter of said electrical circuit when said length indication means is connected to said electrical circuit, said value being related to the length of said optical cable, said length indication means disposed between a section of said cable holder body and said connector housing means and accessible from without through said access means; and
 electrically conducting contact means attached to said connector housing means and formed to electrically connect said length indication means to said electrical circuit.

2. The invention of claim 1 wherein said connector housing means comprises a hollow body portion wherein the access means comprises at least one access hole therethrough; and wherein said contact means comprises at least one contact lug positioned in said at least one access hole and contacting said length indication means.

3. The invention of claim 1 wherein said connector housing means comprises a hollow body portion wherein the access means comprises at least first and second pairs of access holes with said first pair located in a first cross-sectional region of said hollow body portion; and wherein said contact means comprises at least first and second pairs of contact lugs disposed in said first and second pair of access holes respectively; and wherein said length indication means comprises at least first and second spaced apart connector members which can be selectively electrically conducting and alternately non-conducting, said first connector member disposed to be aligned with said first pair of access holes and in contact with said first pair of contact lugs, and said second connector member disposed to be aligned with said second pair of access holes and in contact with said second pair of contact lugs.

4. A connection arrangement for connecting an optical cable to an electric circuit comprising:
an electrical circuit including a photodetector and a variable gain preamplifier attached thereto;
an optical cable connector including:
a cable holder body for gripping the end of said optical cable;
a first connector housing having a detector end portion disposed to receive said photodetector; and a hollow body portion connected to said detector end portion and disposed to receive said cable holder body, said hollow body portion having a plurality of access holes extending therethrough;
at least one connector portion surrounding said cable holder body and disposed between said cable holder body and said hollow body portion when said cable holder body is inserted into said hollow body portion, said at least one connector portion aligned with selected ones of said access holes;
an electrical contact member for each of said selected ones of said access holes, said contact members attached to said connector housing and making an electrically insulating contact thereto; said contact members also connected to said preamplifier; said contact members each including a contact lug, said lugs extending into said selected ones of said access holes to contact said at least one connector portion.

5. The invention of claim 4 wherein said plurality of access holes are located in at least first and second cross-sectional regions of said hollow body portion respectively; and wherein said connector comprises first and second spaced apart connector portions associated with said first and second pairs of access holes respectively.

6. The invention of claim 5 wherein said variable gain preamplifier has a plurality of gain settings and at least first and second pairs of gain setting terminals; and said electrical circuit further comprises connection circuit means for connecting said at least said first and second pairs of gain setting terminals to said contact members associated with said first and second pairs of access holes respectively.

7. The invention of claim 6 wherein said connection circuit means comprises first and second field effect transistors (FET) connected to said first and second gain setting terminals respectively, the gate connection of said first FET connected to a first one of said contact members associated with said first pair of said access holes, and the gate connection of said second FET connected to a first one of said contact members associated with said second pair of said access holes, the remaining contact members associated with said first and second pairs of access holes being connected to a common electrical ground.

* * * * *